Nov. 24, 1964  O. F. HIPKINS  3,158,835
SAFETY DEVICE SIGNAL PICK-UP FOR MOTOR VEHICLES
Filed July 14, 1961

INVENTOR
OTHO F. HIPKINS
BY Fisher, Christen and Goodson
ATTORNEYS

United States Patent Office 3,158,835
Patented Nov. 24, 1964

3,158,835
SAFETY DEVICE SIGNAL PICK-UP FOR MOTOR VEHICLES
Otho F. Hipkins, 617 Shore Drive, Oldsmar, Fla.
Filed July 14, 1961, Ser. No. 124,136
1 Claim. (Cl. 340—34)

This invention relates to a safety device for motor vehicles and specifically relates to apparatus for detecting and amplifying traffic noise and transmitting them to the operator of a substantially enclosed vehicle.

As the weather-proofing, tightness, sound-proofing, and otherwise improved body structures of automobiles are developed, valuable warning signals gained by ear are substantially eliminated. This is further complicated by the manufacture of large numbers of vehicles equipped with air conditioners and radios. It is, therefore, an objective of this invention to provide an electrical warning system which is adapted to substantially duplicate the acoustic sounds which otherwise would be heard by the driver in the absence of the above-described environment.

An important advantage of this invention is to provide means which enable a driver in traffic to avoid accidents which can be prevented if proper cognizance is taken of normal warning signals which are not heard due to closed windows, car noises, etc., which impair a driver's hearing.

A further objective of this invention is to provide structure of the described nature which will secondarily permit vehicle manufacturers to completely insulate the body of automobiles against the elements without fear of causing the inherent danger resulting from insulating the driver from noises which are occurring about him.

A still further objective of the invention is to provide the above advantages and objectives without an undue disturbing effect on the remaining passengers in the vehicle.

A still further very important objective of this invention is to provide a warning device which produces a stereophonic duplication of outside noises which will effectively inform the driver as to the direction, as well as the presence, of outside warning sounds.

Another very important objective of the invention is to provide a structure accomplishing the above objectives and advantages which includes a sensing unit placed such that important warning sounds will be detected without amplifying slip stream noises, automobile vibrations, exhaust noises, and other disturbances caused by the vehicle on which the unit is mounted.

These and other objectives and advantages of the invention will hereinafter become more fully apparent from the following description of the drawings, illustrating a presently preferred embodiment thereof, and wherein.

Figure 1:
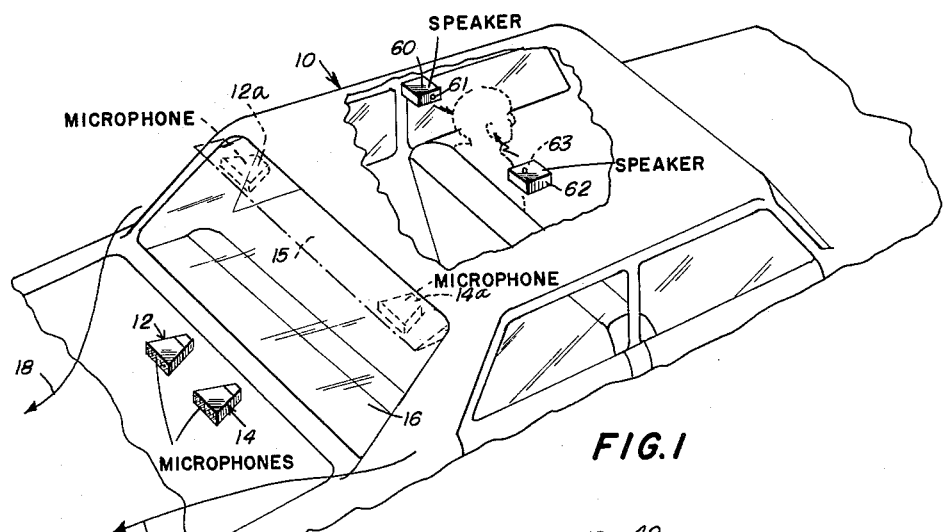
FIG. 1 is a partial perspective of an automobile equipped with the warning system.
Figure 2:
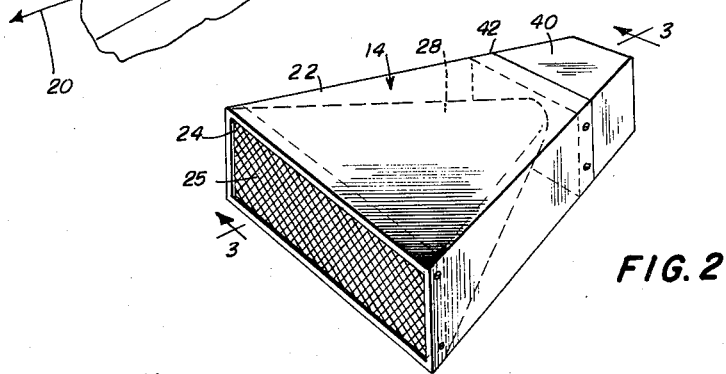
FIG. 2 is an enlarged perspective of a pick-up unit.
Figure 3:
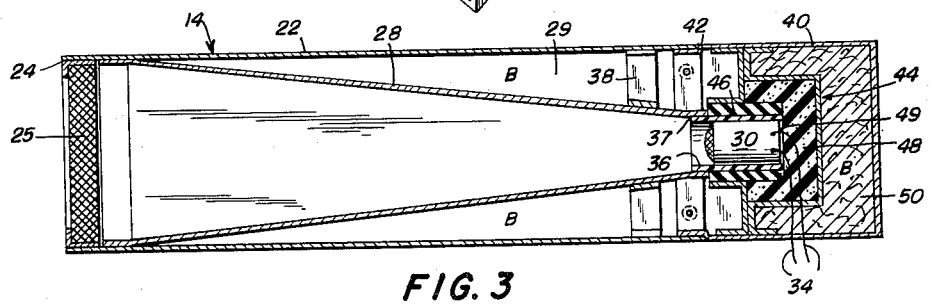
FIG. 3 is a cross-sectional view along the line 3—3 of FIG. 2.

Referring now to the drawings, where like numerals indicate like elements, the invention is adapted for use with an automobile 10. In a stereophonic embodiment a pair of noise sensing devices 12 and 14 are secured to the rear of the automobile immediately adjacent the rear window 16, and on either side of the central longitudinal axis of the vehicle. The placement of these sensing units is very important to the efficient operation of the system. At normal speeds, a slip stream of air substantially following the paths depicted by arrows 18 and 20 surrounds the moving vehicle. By placing the sensing devices, microphones in this instance, as shown in FIG. 1, they are protected from the slip stream as well as other noises caused by tires and the exhaust system of the vehicle.

An alternative sensing unit placement is disclosed by the dotted lines of FIG. 1 and indicated by the numerals 12a and 14a. Here, it is contemplated that the units will be installed during the production of the vehicle and an overhang 15 is provided to protect the units from the roof slip-stream. The full line placement is best suited for adapting the invention to existing vehicles.

The important principle to be observed is the lateral rear placement away from the above mentioned disturbances. For instance, if the invention is adapted for use with a tractor-trailer, the sensing units are placed substantially laterally of the rear width of the trailer and substantially above the road. In other words, it is not the relationship of the unit with the rear window that is important, but it is relationship with unwanted noises caused by the vehicle to which the sensing means is mounted.

The sensing assemblies are operatively identical. Therefore, assembly 14 will be described in detail with the understanding that sensing assembly 12 is the same.

Each assembly is enclosed in a housing 22 which is a substantially rectangular funnel having an enlarged opening 24 enclosed by a replaceable dust filter element 25. A truncated member 28, of smaller dimensions and spaced within the housing 22, directs sounds penetrating the dust filter 25 to a sensitive microphone unit 30. The electrical pick-up 30 is of conventional design and of a type which transmits detected noise intelligence via a pair of electrical leads 34.

The microphone itself is surrounded by a plastic tube 36 which mates with the smaller opening 37 of member 28. A stabilizing element 38 maintains member 28 substantially axially aligned within housing 22. The space between housing 22 and member 28 is denoted by the letter B. A sub-housing 40 attached to housing 22 at point 42 directly supports the pick-up via a pair of stabilizing members 42 and 44.

The stabilizer 42 has an outside periphery which is press-fittedly secured in sub-housing 40 and has a central opening adapted to receive the forward portion of the pick-up. The stabilizer 42 has an outside periphery which is press-fittedly received in sub-housing 40 and has a central pocket 49 adapted to receive the rear portion of the pick-up. Spaced between the tube 36 and stabilizing member 42 is a resilient sleeve 46, and spaced between pocket 49 and the sleeve-microphone unit, is a rubber enclosure 48. A further shock-reducing and insulating material 50, such as Fiberglas, is used to insulate the microphone from vibration in that void between member 44 and the sub-housing 40.

It is essential that the cushioning structure described above be capable of substantially eliminating false noise vibrations from being detected by the microphone due to movements of the vehicle. It is equally essential that the microphone 30 be insulated against excessive atmospheric temperatures, either high or low, which would affect its operation. The space B between said housing 22 and member 28, in conjunction with materials 48 and 50 effectively perform this function.

Figure 4:
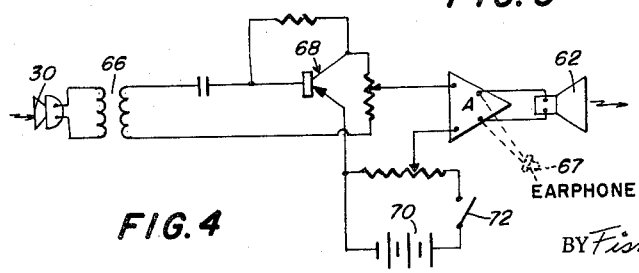
FIG. 4 is a schematic of the electrical circuitry.

Detected noises sensed by units 12 or 12a and 14 or 14a are transmitted, respectively, to a pair of speakers 60 and 62 mounted interiorly of the vehicle. The transmitting and amplifying circuitry may be of standard design, an example of which is shown in FIG. 4. A coupling unit 66 transmits a generated noise signal to the transistor amplifier 68 where it is led to the speakers 62. The system receives its power via connections to the vehicle's battery 70 and is activated by the closing of the vehicle ignition switch 72. This type of hook-up is conventional for vehicle accessories and will be well understood by those skilled in the art.

It should be noted here, that microphone 12 feeds to speaker 60 on an independent circuit, and microphone 14 feeds to speaker 62 on another independent circuit. As sounds are transmitted to these speakers, their relative amplitude will aid the operator in determining direction. The unit 60 is mounted at a point along the side of the car closest to the operator's left ear, and speaker 62 is mounted along the interior top of the car at a distance from the operator's right ear precisely that of speaker 60. In essence, this is a stereophonic pick-up, in that the driver knows from what direction the sound he hears is coming, depending on what he hears in his right or left ear.

In lieu of speakers 60 and 62, a pair of earphones, such as that shown diagrammatically as 67 (FIG. 4), may be utilized by the operator. In this instance, of course, the precise distance of the amplifying units from the driver's ears is not critical. The speakers 60 and 62 are provided with ear plug jacks 61 and 63 for this purpose.

In a general manner, while I have, in the above description, disclosed what I deem to be practical and efficient embodiments of my invention, it should be well understood that I do not wish to be limited thereto, as there might be changes made in the arrangement, disposition and form of the parts without departing from the principle of the present invention as comprehended within the scope of the accompanying claim.

I claim:

The method of informing a driver of a substantially closed vehicle of the existence and direction of external noise sources comprising the steps of: disposing externally of the vehicle, in positions out of its slip stream, a pair of microphones respectively at left and right hand spaced-apart positions relative to the longitudinal axis of the vehicle; disposing a pair of speakers internally of the vehicle in uniform spaced-apart relation to the ears of the driver when situated in normal driving position; the positions of said speakers being, respectively, left and right hand relative to the driver; conveying energy in accordance with external moving sound sources and stationary sound sources from the right hand external microphone to the right hand internal speaker; and conveying energy in accordance with said external moving and stationary sound sources from the left external microphone to the left internal speaker whereby the driver receives impressions of directions from the external sounds emanating regardless of whether the vehicle is moving or stationary.

References Cited in the file of this patent

UNITED STATES PATENTS

| | | |
|---|---|---|
| 1,855,146 | Jones | Apr. 19, 1932 |
| 1,855,148 | Jones | Apr. 19, 1932 |

FOREIGN PATENTS

| | | |
|---|---|---|
| 145,584 | Switzerland | Feb. 28, 1931 |
| 758,829 | France | Jan. 24, 1934 |
| 770,652 | France | Sept. 18, 1934 |